(12) United States Patent
Kaliss

(10) Patent No.: US 8,666,822 B1
(45) Date of Patent: Mar. 4, 2014

(54) MANAGING ONLINE ADVERTISING CAMPAIGNS

(75) Inventor: Mark A. Kaliss, New York, NY (US)

(73) Assignee: E&J New Media, LLC, New York, NY (US)

(*) Notice: Subject to any disclaimer, the term of this patent is extended or adjusted under 35 U.S.C. 154(b) by 50 days.

(21) Appl. No.: 13/308,446

(22) Filed: Nov. 30, 2011

(51) Int. Cl.
*G06Q 10/00* (2012.01)

(52) U.S. Cl.
USPC .................................................. 705/14.73

(58) Field of Classification Search
USPC ........................................... 705/14.73
See application file for complete search history.

(56) References Cited

U.S. PATENT DOCUMENTS

| | | | | |
|---|---|---|---|---|
| 6,330,317 | B1* | 12/2001 | Garfinkel | 379/196 |
| 2006/0047571 | A1* | 3/2006 | Garcia et al. | 705/14 |
| 2007/0112656 | A1 | 5/2007 | Howe et al. | |
| 2007/0189473 | A1 | 8/2007 | Altberg et al. | |
| 2008/0250035 | A1* | 10/2008 | Smith et al. | 707/100 |
| 2009/0100139 | A1 | 4/2009 | Purdy et al. | |
| 2010/0063890 | A1* | 3/2010 | Huckleby | 705/26 |
| 2010/0071011 | A1* | 3/2010 | Addair et al. | 725/107 |

OTHER PUBLICATIONS

Customer Service CRM in Growing Business. Challenges and Solutions. CRM Magazine. Nov. 2011.*
eStara Click Suite for Interactive Marketers. Aug. 14, 2007.*
Rocha, Roberto. Help Desk Tracks Your Browsing. CanWest News. May 20, 2006.*
Mobile Marketing Association, "Mobile Advertising Guidelines Version 5.0," <http://www.mmaglobal.com/mobileadvertising.pdf>, 25 pages (accessed Oct. 14, 2011).
Interactive Advertising Bureau, "IAB Platform Status Report: A Mobile Advertising Overview," <http://www.iab.net/media/file/moble_platform_status_report.pdf>, 24 pages (accessed Oct. 14, 2011).
Jumptap, "Create New Campaign & Ads," <https://support.jumptap.com/index.php/JFA_Create_CampAd>, 8 pages (accessed Oct. 14, 2011).

* cited by examiner

*Primary Examiner* — Johnna Loftis
(74) *Attorney, Agent, or Firm* — Klarquist Sparkman, LLP

(57) ABSTRACT

Techniques and tools are described for managing interaction with electronic advertisements. In some examples, user contact information is received from a user who has indicated interest in an electronic advertisement, where the user contact information comprises the user's phone number. A do-not-call status of the user is determined based at least in part on the user's phone number. Based on the do-not-call status, further action is taken, such as providing a message to the user. In some situations, the message provided to the user can include a click-to-call link for contacting the advertiser.

21 Claims, 7 Drawing Sheets

FIG. 5

Online College Advertisement

Full Name:

Address:

Zip Code:

Phone:

Email:

By clicking Submit, you agree that a representative may contact you.

SUBMIT

MANAGING ONLINE ADVERTISING CAMPAIGNS

BACKGROUND

Traditional online advertising campaigns may involve the display of electronic advertisements on devices such as computers and mobile phones. Selecting an electronic advertisement can display additional information regarding the advertisement, such as a web page, information collection form, product information, or phone number that the user can call for more information.

With some online advertising campaigns, the advertiser may wish to collect information regarding the user. The advertiser may wish to collect information so that the advertiser can contact the user at a later time or market a specific product or service to the user. However, in some situations, contacting the user directly may be problematic. For example, the user may be listed on a do-not-call list thus prohibiting the advertiser from calling the user. In this situation, the potential lead may have little, or no, value to the advertiser.

Therefore, there exists ample opportunity for improvement in technologies related to managing online advertising campaigns.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for managing interaction with electronic advertisements. For example, user contact information can be received from a user via a form associated with an electronic advertisement (e.g., a form displayed to the user in response to the user selecting the electronic advertisement). The user contact information can be received, processed, and action taken based on a result of the processing. For example, a do-not-call status of the user can be determined based on the user contact information, and different responses can be provided to the user depending on the do-not-call status.

For example, a method for managing interaction with an electronic advertisement comprises receiving user contact information submitted by a user who has indicated interest in an electronic advertisement, where the user contact information comprises the user's phone number. The method further comprises determining a do-not-call status of the user based at least in part upon the user's phone number. The do-not-call status of the user can be determined by checking whether the user is represented (e.g., user's phone number listed, user's name listed and/or other criterion) in a do-not-call list, or by providing the user's phone number to a do-not-call checking service then receiving an indication (from the checking service) of whether the user is represented in a do-not-call list. The method also comprises, upon determining the do-not-call status indicates that the user is represented in at least one of the one or more do-not-call lists, providing a click-to-call link for contacting an advertiser associated with the electronic advertisement, where the click-to-call link comprises a phone number associated with the advertiser. The click-to-call link can be provided as part of a web page, in an email message, in a text message, or in some other way. On the other hand, if the do-not-call status of the user indicates that the user is not represented in any of the do-not-call lists, the method can further include providing, to the advertiser, at least some of the user contact information and an indication that a phone call can be initiated to the user's phone number.

As another example, a server system is provided for managing interaction with an electronic advertisement. The server system comprises a memory, a processing unit, and a network connection. The server system is configured for performing operations comprising determining user contact information for a user who has indicated interest in an electronic advertisement (e.g., by selection of the electronic advertisement). The server system can determine the user contact information by receiving the user contact information from the user (via form or otherwise), or by retrieving the user contact information from storage (the user contact information having been previously submitted by the user). The user contact information comprises the user's phone number. The operations of the server system also include determining a do-not-call status of the user based at least in part upon the user's phone number, and, upon determining the do-not-call status indicates that the user is represented in at least one of the one or more do-not-call lists, providing a click-to-call link to the user for contacting an advertiser associated with the electronic advertisement, where the click-to-call link comprises a phone number associated with the advertiser.

As another example, a method is provided for managing interaction with an electronic advertisement. The method comprises receiving an indication of a selection of the electronic advertisement by a user using a mobile computing device, and, in response to receiving the selection of the electronic advertisement, providing a landing page associated with the electronic advertisement to the user, where the landing page comprises a form for collecting user contact information. The method further comprises receiving the user contact information submitted by the user via the form, where the user contact information comprises the user's name, phone number, and email address. The method further comprises determining a do-not-call status of the user based at least in part upon the user's phone number, including checking whether the user is represented in any of one or more do-not-call lists. The method further comprises upon determining the do-not-call status indicates that the user is represented in at least one of the one or more do-not-call lists, providing, to the user, a click-to-call link for contacting an advertiser associated with the electronic advertisement, where the click-to-call link comprises a phone number associated with the advertiser. The click-to-call link is formatted to facilitate selection of the click-to-call link by the user to automatically initiate a phone call to the phone number associated with the advertiser.

The foregoing and other objects, features, and advantages of the invention will become more apparent from the following detailed description, which proceeds with reference to the accompanying figures.

BRIEF DESCRIPTION OF THE DRAWINGS

FIG. 5 is a diagram depicting an example form for collecting user contact information when a user has indicated interest in an electronic advertisement.

DETAILED DESCRIPTION

Figure 1:
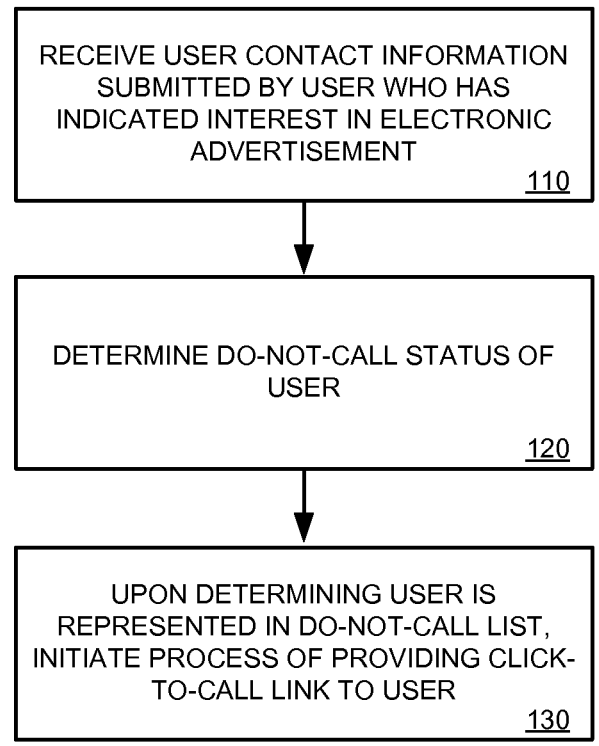
FIG. 1 is a flowchart showing an example method for managing interaction with an electronic advertisement.

The following description is directed to techniques and solutions for managing online advertising campaigns, including techniques and tools for managing interaction with electronic advertisements. For example, user contact information can be received from a user via a form associated with an electronic advertisement (e.g., a form displayed to the user in response to the user selecting the electronic advertisement). The user contact information can be received, processed, and action taken based on a result of the processing. For example, a do-not-call status of the user can be determined based on the user contact information, and different responses can be provided to the user depending on the do-not-call status. The different responses can comprise responses tailored to users who are represented in the do-not-call lists (e.g., user's phone number listed, user's name listed and/or other criterion) and responses tailored to users who are not represented in the do-not-call lists. For example, a click-to-call link can be provided (e.g., with emphasis) to those users who are represented in the do-not-call lists, while the click-to-call link is not be provided (or is provided with less emphasis) to those users who are not represented in the do-not-call lists.

In addition to, or instead of, determining a do-not-call status of the user, other action can be taken based on the received user contact information and/or other information related to the user or the user's device (e.g., the user's mobile phone). In some implementations, a wireless carrier of the user's device is determined (e.g., based at least in part on an Internet Protocol (IP) address associated with the user's device). The wireless carrier can be used to prioritize the user as an advertising lead (e.g., primarily pre-paid wireless carriers leads can be prioritized lower than primarily non-pre-paid wireless carriers). Other information can also be used to prioritize the user as a lead (e.g., in addition to, or instead of, the user's wireless carrier). For example, financial, credit, and/or demographic information can be obtained for a user. This information can then be used in prioritizing the user as a lead (e.g., users that own a home can be prioritized higher as leads for a mortgage refinancing advertiser).

In some implementations, subsequent information can be provided to the user (e.g., after the user has submitted a contact information form). For example, subsequent information, such as a targeted advertisement, can be provided to the user based on financial, credit, and/or demographic information of the user. As another example, subsequent information, such as location-based information, can be provided to the user based on the user's location (e.g., determined based on the user's mobile device location and/or user contact information). For example, if the user entered user contact information in response to an insurance company electronic advertisement, a subsequent page can be provided to the user containing information for a local agent of the insurance company.

In some embodiments, an electronic (e.g., online) advertisement is provided to a user for display via the user's computing device. For example, the advertisement may be in the form of a banner advertisement displayed within an application running on the user's mobile device (e.g., the user's smart phone). The user can select (e.g., tap or click) the advertisement. Selecting the advertisement can result in display of a landing page (e.g., a web page or another type of displayed page, such as a pop-up page) provided by a server system to the user. The landing page can comprise a form providing for entry of user contact information. The user contact information can be used (e.g., by the advertiser) to call the user and/or provide additional information to the user (e.g., send an email or text message to the user).

Exemplary Publisher

In the techniques and solutions described herein, a publisher refers to an entity (a person, business, organization, etc.) that provides application content or information content. For example, a publisher can be a business that sells an application (e.g., an "app") on a mobile phone marketplace. Or, a publisher can be a business that provides new or entertainment content. In some situations, the publisher may want to include advertisements with the application or information content (e.g., to increase revenue by receiving compensation for displaying the ad to users of the application). The advertisements can be displayed within information content/application content or separately by the application (e.g., as a pop-up ad).

In some embodiments, banner advertisements (banner ads) are displayed with applications on mobile devices. For example, a publisher's application can be displayed on a mobile device, such as a smart phone. Along with the publisher's application, a banner ad (e.g., a rectangular graphical advertisement) can be displayed (e.g., displayed near the top or bottom of the application). For example, the banner ad could be an ad for an insurance company, auto manufacturer, employment service, etc.

Exemplary Advertiser

In the techniques and solutions described herein, an advertiser refers to an entity (a person, business, organization, etc.) that wishes to advertise to customers (e.g., by placing advertisements with publishers). For example, the advertiser could be an automobile manufacturer that wants to advertise its products to customers. In order to advertise its products, the advertiser's ads (e.g., banner ads) can be presented to potential customers via a publisher (e.g., presented by the publisher's applications or information content).

An advertiser may want to collect user contact information in order to further market to the user. In order to collect user contact information, a landing page can be displayed to users who select the advertiser's ad. The landing page can be provided by the advertiser (e.g., hosted by a web server associated with the advertiser) or by another entity (e.g., provided by an advertising service provider). The landing page can comprise a form with form fields for the user to enter user contact information (e.g., name, address, zip code, phone number, email address, etc.).

Exemplary Do-Not-Call Status

In the techniques and solutions described herein, the do-not-call status of a user can be determined. The do-not-call status of the user can comprise an indication of whether the user is represented in one or more do-not-call lists. For example, the status can indicate the user is represented in one or more of the do-not-call lists or that the user is not represented in any of the do-not-call lists. The status can also indicate in which list (or lists) the user is represented.

Checking whether the user is represented in a do-not-call list can comprise checking whether the user's phone number is in the list. Checking whether the user is represented in a do-not-call list can also comprise checking whether additional user information (e.g., the user's name) is in the list. The checking can be performed by the server system that provides electronic advertisements, landing pages and/or call-to-click links. Or, the checking can be performed by a separate do-not-call checking service to which the server system provides user contact information such as the user's phone number.

Various types of do-not-call lists can be checked. The do-not-call lists can be national lists, state lists, organization or business lists, and/or other do-not-call lists. For example, the National Do Not Call Registry can be the (or one of the) do-not-call lists that is checked.

Different action can be taken depending on the do-not-call status of the user. For example, different types of messages can be provided to the user based on the user's do-not-call status. In some implementations, a click-to-call link is provided only to users who are represented in one or more do-not-call lists. In other implementations, a click-to-call link is provided regardless of do-not-call status, but message content is different based on do-not-call status (e.g., the click-to-call link may be emphasized or promoted when the user is represented in one or more do-not-call lists and/or other message content may be different).

Exemplary Interacting with Electronic Advertisements

In the techniques and solutions described herein, information can be obtained from a user who has indicated interest in an electronic advertisement, the information can be processed, and one or more actions can be taken in response to the processing. For example, a user can provide user contact information via a form displayed in response to the user selecting the electronic advertisement, and a do-not-call status of the user can be determined. Depending on the do-not-call status of the user, different action can be taken (e.g., a click-to-call link can be provided to the user to contact the advertiser).

FIG. 1 is a flowchart showing an exemplary method 100 for managing interaction with an electronic advertisement. At 110, user contact information is received. The user contact information is submitted by a user who has indicated interest in an electronic advertisement. The user contact information can comprise the user's name, physical address, zip code, phone number, email address, interests, hobbies, education, and/or other information related to the user. The user contact information can be received via a form (e.g., a web form provided to the user (for display) in response to the user selecting a banner advertisement). Or, the user contact information can be retrieved from storage when the user indicates interest in the electronic advertisement (the user contact information having been previously submitted by the user). Or, the user contact information can be determined in some other way.

At 120, a do-not-call status of the user is determined. For example, the do-not-call status of the user can be determined using, at least in part, the user's phone number. Determining the do-not-call status of the user can comprise checking whether the user's phone number is present in one or more do-not-call lists (e.g., using a local or remote do-not-call checking service). For example, when the do-not-call list(s) are locally accessible to a server computer, the server computer can itself check whether the user contact information is listed/not listed in the do-not-call list(s). Or, the do-not-call status of the user can be determined by providing user contact information (e.g., received at 110) to a local or remote do-not-call checking service and receiving indication(s) back regarding whether the user contact information is listed and/or not listed in one or more do-not-call lists. From the indications, the do-not-call status of the user can be determined.

At 130, upon determining that the do-not-call status of the user 120 indicates that the user is represented in at least one of the one or more of the do-not-call lists (e.g., user's phone number is listed, user's name is listed and/or other user contact information is listed), the process of providing a click-to-call link to the user is initiated. The click-to-call link allows the user to contact an advertiser associated with the electronic advertisement by selecting the click-to-call link to initiate a phone call to the advertiser (e.g., to a representative or affiliate of the advertiser). For example, the click-to-call link can be formatted such that when the link is rendered, the advertiser's phone number (or an indication thereof) is displayed, which the user can select by tapping or clicking (e.g., tapping on the link on the user's mobile phone). The click-to-call link can be provided to the user, for example, as part of a web page transmitted to a computing device of the user, in an email message sent to the user's email address, and/or in a text message.

Figure 2:
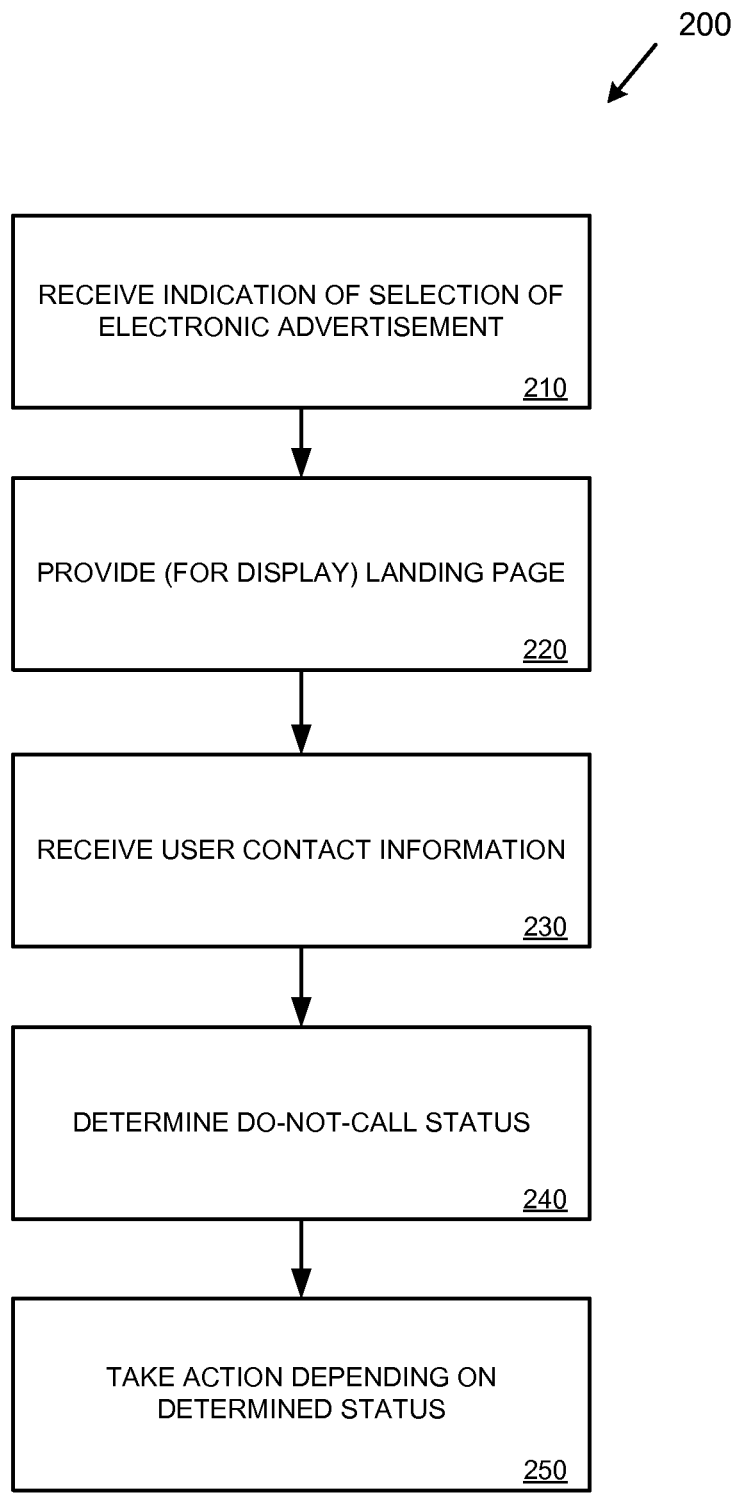
FIG. 2 is a flowchart showing an example method for managing interaction with an electronic advertisement including providing a landing page for collecting user contact information.

FIG. 2 is a flowchart showing another exemplary method 200 for managing interaction with an electronic advertisement. At 210, an indication of a selection of an electronic advertisement is received from a user. For example, the user can be using an application on the user's computing device (e.g., the user's mobile phone). The application can display an advertisement associated with an advertiser (e.g., a banner ad). The user can select the advertisement. Upon selecting the advertisement, the indication can be received 210 from the user's mobile device. The indication can comprise an identifier of the specific advertisement (e.g., by unique advertisement identifier), specific advertiser (e.g., by unique advertiser identifier), and/or other information associated with the advertisement, advertiser, or user (e.g., a Uniform Resource Locator (URL) of a landing page to be displayed to the user in response to the selection).

At 220, a landing page is provided to the user for display (e.g., for display on the user's mobile device) in response to the selection of the electronic advertisement. The landing page comprises a form for collecting user contact information from the user. The user contact information can comprise the user's name, physical address, zip code, phone number, email address, interests, hobbies, education, and/or other information related to the user. The landing page can also comprise information related to the advertiser, such as the advertiser's name, logo, advertisement content (e.g., text, pictures, video, etc.), and links (e.g., links to visit the advertiser on a social networking site). The landing page can also comprise an agreement regarding the submitted user contact information (e.g., that the user agrees the advertiser may contact the user, such as by calling the user).

At 230, the user contact information submitted via the form on the displayed landing page 220 is received. In a specific implementation, the user contact information comprises the user's name, mailing address, phone number, and email address. In another implementation, the user contact information comprises the user's phone number.

At 240, the do-not-call status of the user is determined. For example, the do-not-call status of the user can be determined using the received user contact information 230 (e.g., using, at least in part, the user's phone number). Determining the do-not-call status of the user can comprise checking whether the user's phone number is present in one or more do-not-call lists (e.g., using a local or remote do-not-call checking service).

At 250, action can be taken depending on the determined do-not-call status of the user 240. In some embodiments, different action is taken depending on the determined do-not-call status. For example, if the do-not-call status indicates that the user is represented in at least one of the one or more do-not-call lists, then a click-to-call link can be provided to the user (e.g., via a web page, email message, text message, instant message, etc.). If, however, the do-not-call status indicates that the user is not represented in any of the one or more do-not-call lists, then the step of providing the click-to-call link to the user can be skipped. For example, the user may receive a message that thanks the user for the inquiry, without a click-to-call link.

In other embodiments, different messages are provided to the user depending on the determined do-not-call status of the user. For example, if the do-not-call status indicates that the user is represented in at least one of the one or more do-not-call lists, then a first message type can be provided to the user (e.g., provided via a web page, email message, text message, instant message, etc.). Because the user is represented in a do-not-call list, and therefore the advertiser may be unable to call the user, the first message type can encourage the user to contact the advertiser (e.g., by providing a click-to-call link with the message). If, however, the do-not-call status indicates that the user is not represented in any of one or more do-not-call lists, then a second message type can be provided to the user (e.g., provided via a web page, email message, text message, instant message, etc.). Even though the advertiser may be able to call the user in this situation (because the user is not represented in one or more do-not-call lists), a message can still be provided to the user. The second message type can comprise different content than the first message type. For example, the second message type may indicate that the advertiser will be contacting the user and might not include a click-to-call link. In some situations, however, the second message type may comprise a click-to-call link in case the user wishes to contact the advertiser (e.g., instead of waiting for the advertiser to call).

In other embodiments, the do-not-call status can further indicate a time window for calling the user. For example, some do-not-call lists (e.g., state-operated do-not-call lists) can impose a time limit within which a user, who has initiated contact, can be called (e.g., a three-day window from the user's contact). In this situation, an indication can be provided to the advertiser that the user can be called within a certain timeframe (e.g., the next three days). Once that timeframe has expired (or is about to expire), other action can be taken. For example, shortly before the timeframe is to expire, a reminder can be sent to the advertiser (e.g., stating that the user can only be called within the timeframe). A time window can also be used in prioritizing the user as a lead. For example, if there is a short time window (or a short time remaining) for contacting (e.g., calling) the user, then the user can be prioritized higher than other users for which more time remains for contacting the other others.

Figure 3:
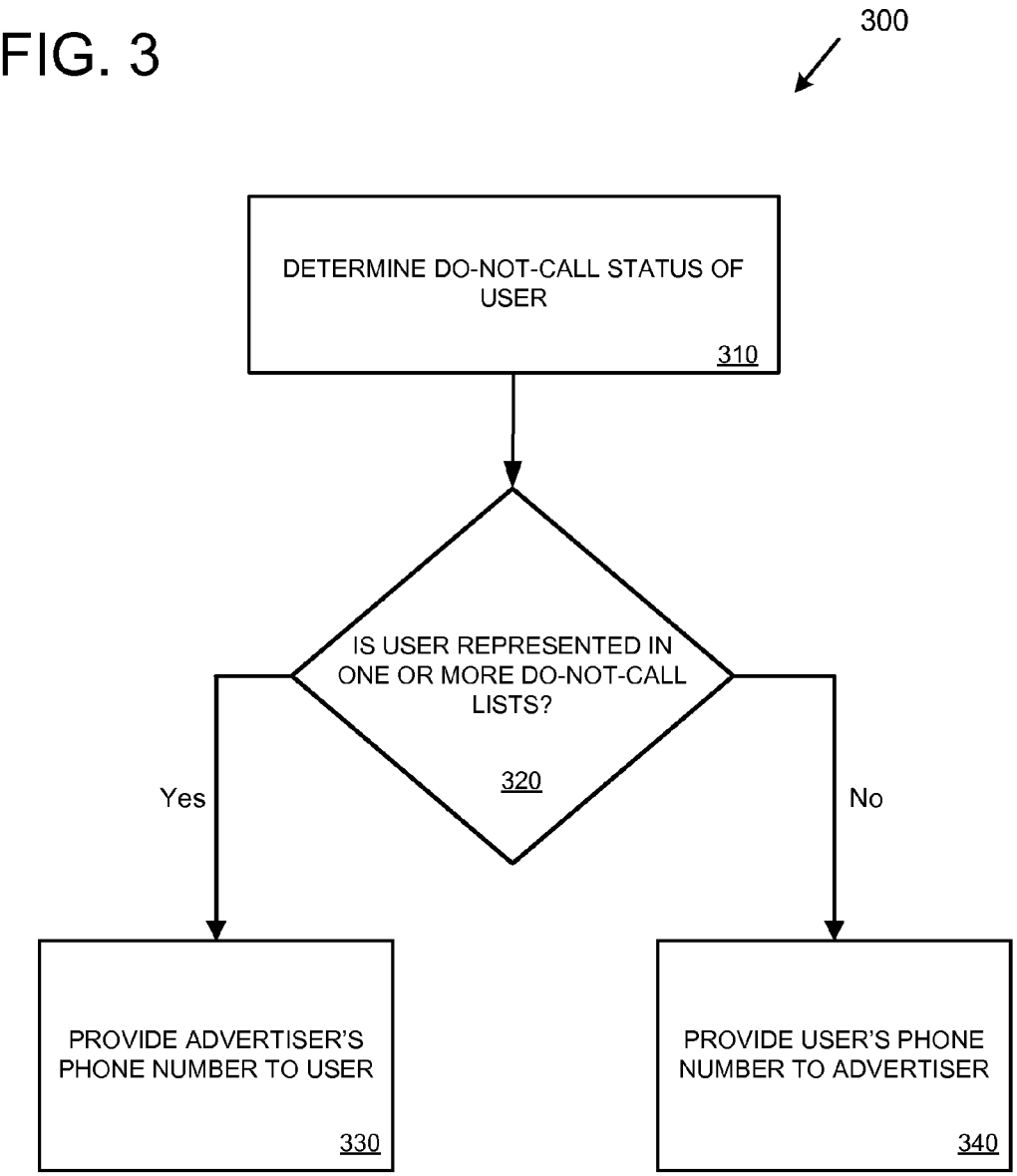
FIG. 3 is a flowchart showing an example method for taking different action depending on a user's do-not-call status.

FIG. 3 is a flowchart showing an exemplary method 300 taking different action in response to a user's do-not-call status. At 310, the do-not-call status of the user is determined. For example, the do-not-call status of the user can be determined by checking whether the user is listed in one or more do-not-call lists (e.g., whether the user's phone number, name, email address, etc. is listed in one or more do-not-call lists).

At 320, different action is taken depending on the do-not-call status of the user 310. Specifically, if the user is represented in one or more do-not-call lists, the action 330 is performed. At 330, the advertiser's phone number is provided to the user. For example, the advertiser's phone number can be provided to the user as a click-to-call link (e.g., in a web page, email message, text message, etc.).

If the user is not represented in the one or more do-not-call lists, then action 340 is performed. According to 340, the user's phone number is provided to the advertiser. For example, the user's phone number can be provided to the advertiser along with an indication that the user is not listed in one or more do-not-call lists. The indication can inform the advertiser that the advertiser may contact (e.g., call) the user.

In alternate embodiments, different types of action can be performed at 330 and 340. For example, a first message type can be provided at 330. The first message type could contain a message that encourages the user to contact the advertiser using a click-to-call link within the message. A second message type can be provided at 340. The second message type could contain a message that informs the user that a representative will contact the user. The second message type could, in some situations, also contain a click-to-call link (e.g., without the degree of emphasis or encouragement of the first message type for the user to select the click-to-call link).

Multiple types of action can be performed at 330 and 340. For example, at 330, at least some of the user's contact information can be provided to the advertiser (e.g., along with the user's do-not-call status) in addition to the advertiser's phone number being provided to the user (e.g., as a click-to-call link).

In some embodiments, a user can interact with an electronic advertisement. For example, a user can select an advertisement displayed on the user's device (e.g., the use's mobile computing device, such as the user's mobile phone). In response to the user's selection of the advertisement, the user's device can display a form (e.g., within a landing web page received by the user's device from a server system, such as a service provider server system or an advertiser server system). Using the form, the user can fill out user contact information (e.g., the user contact information can comprise the user's phone number). The can submit the form (e.g., the user's device can send the form contents to a server system). Following submission of the form, the user's device can receive a message for display to the user (e.g., web page, pop-up content, text message, instant message, or another type of message) comprising a click-to-call link for contacting an advertiser associated with the advertisement (e.g., if the user selects the click-to-call link, a phone call can be automatically initiated to the advertiser or a representative of the advertiser). For example, the message received by the user can be determined based on a do-not-call status of the user. For example, submission of the form can cause a server system to determine a do-not-call status of the user (e.g., based at least in part on the user's phone number) and provide a message to the user for display by the user's device (e.g., the message can be different depending on the do-not-call status of the user).

Exemplary System for Interacting with Electronic Advertisements

In the techniques and solutions described herein, a system can be provided for collecting user contact information when a user has indicated interest in electronic advertisements, processing the received user contact information, and taking different action depending on the processing.

Figure 4:
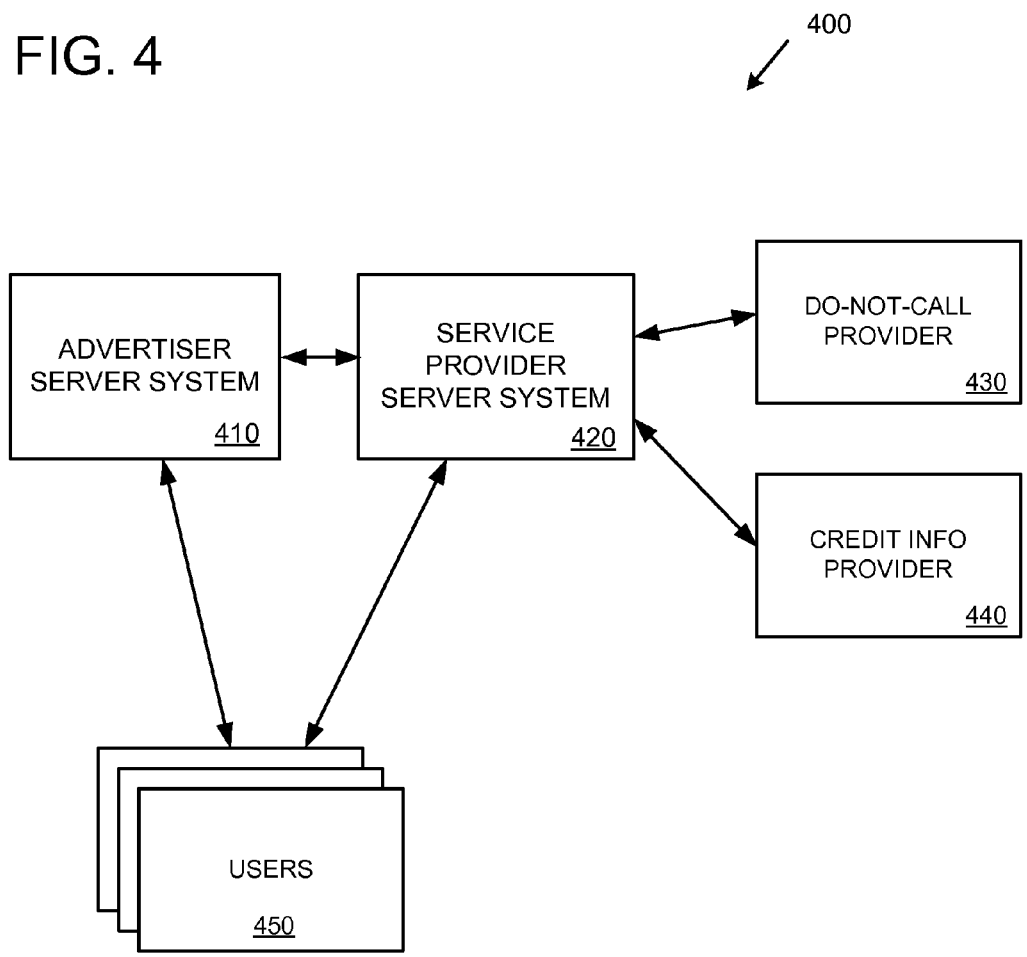
FIG. 4 is a diagram depicting an example environment for collecting and processing user contact information in relation to electronic advertisements.

FIG. 4 is a diagram showing an exemplary environment 400 for managing interaction with an electronic advertisement. The environment 400 comprises an advertiser server system 410 (or multiple advertiser server systems). The advertiser server system 410 can comprise computing resources (e.g., one or more computer servers, database servers, web servers, networking equipment, and/or other types of computing resources). The advertiser server system 410 can be configured to receive indications that users (such as users 450) have selected electronic advertisements and provide landing pages for the users to enter user contact information in response to selection of the electronic advertisements.

In a specific implementation, the advertiser server system 410 hosts web landing pages (e.g., landing pages for one or more advertising campaigns). The web landing pages include web forms for collecting user contact information. For example, a user (e.g., one of the users 450) can select an advertisement displayed by the user's computing device (e.g., mobile phone). An indication of the selected advertisement can be received by the advertiser server systems 410. In response, the advertiser server systems 410 can provide (for display) a web landing page to the user. The web landing page can include a form into which the user can enter user contact information (e.g., the user's name, physical address, zip code, phone number, email address, etc.). The advertiser server system 410 can collect the user contact information, store it (e.g., in a database), process it, and/or provide it to other systems (e.g., provide it to the service provider server system 420).

The environment 400 also comprises a service provider server system 420 (or multiple service provider server systems). The service provider server system 420 can comprise computing resources (e.g., one or more computer servers, database servers, web servers, networking equipment, and/or other types of computing resources). In the role of advertising server system, the service provider server system 420 can be configured to receive indications that users (such as users 450) have selected electronic advertisements or otherwise indicated interest in electronic advertisements. In the role of advertising server system, the service provider server system 420 can also be configured to provide landing pages for the users to enter user contact information in response indication of interest in the electronic advertisements. The service provider server system 420 can thus receive user contact information. The service provider server system 420 can also receive user contact information that has been collected by the advertiser server system 410. Or, the service provider server system 420 can determine user contact information in some other way (e.g., from previously submitted user information stored by the system 420).

The service provider server system 420 can also be configured to process received user contact information. Processing the received user contact information can include determining a do-not-call status of a user based on the received contact information for the user. Determining the do-not-call status of the user can be performed by the service provider server system 420, alone or in combination with information received from a do-not-call provider 430 that implements a do-not-call checking service. In a specific implementation, the service provider server system 420 provides certain user contact information (e.g., the user's phone number) to a do-not-call provider 430 (e.g., a remote do-not-call provider service accessed via the Internet). The do-not-call provider 430 can check whether the user is represented in one or more do-not-call lists (e.g., one or more national, regional, local, or organization do-not-call lists). For example, the do-not-call provider 430 can check whether the user's phone number is listed in the do-not-call lists. An indication of whether the user is represented in the do-not-call list(s) can be provided to the service provider server system 420. For example, the indication of whether the user is represented in the list(s) can include an indication that the user is listed in one or more of the do-not-call lists, or an indication that the user is not listed in any of the do-not-call lists. The indication of whether the user is represented in the list(s) can also include an indication of which lists include the user (e.g., the user may only be listed in the national do-not-call registry or the user may only be listed in the do-not-call list of a specific organization).

The service provider server system 420 can also be configured to take action based on the do-not-call status of the user. For example, if the do-not-call status of one of the users 450 indicates that the user is represented in one or more do-not-call lists, the service provider server system 420 can initiate the process of providing a click-to-call link to the user (e.g., in a web page transmitting to a computing device of the user, email message sent to the user's email address, text message, etc.) so that the user can select the click-to-call link to call the advertiser. In some implementations, the service provider server system 420 itself provides the click-to-call link to the user. In other implementations, the service provider server system 420 initiates the process by communicating to another server system (e.g., advertiser server system 410) that the click-to-call link can be provided to the user. If the do-not-call status of one of the users 450 indicates that the user is not represented in any of the do-not-call lists, the service provider server system 420 initiates the process of providing a different message to the user, such as a message indicating the advertiser will contact the user (e.g., without containing a click-to-call link).

In some implementations, a click-to-call link can be provided to the user regardless of whether the user is represented in one or more do-not-call lists. Even if a click-to-call link is provided to the user in both situations, the content of the message provided to the user can be different. For example, if the user is represented in one or more do-not-call lists, the message can strongly encourage the user to contact the advertiser by selecting the click-to-call link. If the user is not represented in any of the do-not-call lists, the message can state that the advertiser will contact the user, but if the user wishes to contact the advertiser sooner, the user may select the click-to-call link.

The service provider server system 420 can also be configured to process received user contact information using a credit info provider 440. For example, the credit info provider 440 can provide credit scores, financial information, and/or other information regarding the user. The service provider server system 420 can provide user contact information for a specific user to the credit info provider 440 and receive credit information for the user in return. In order to ensure privacy of the user's credit information, the service provider server system 420 can store the user's credit information and limit access to such information by other systems, such as the advertiser server system 410.

The service provider server system 420 can be configured to take action based on the credit information of the user, alone or in combination with the do-not-call status of the user. For example, after the user has completed the form to provide the user's contact information, a targeted advertisement can be displayed to the user (or sent in an email or text message to the user) based on the credit information (e.g., if the user has a high credit score, then an advertisement for a luxury auto manufacturer can be displayed).

The service provider server system 420 can also be configured to provide information to one of the users 450 based on the user's location. For example, an advertiser may have different locations, each with its respective phone number. If a click-to-call link is provided to the user, the click-to-call link can comprise a phone number based on the user's location. The user's location can be determined, for example, by the user contact information (e.g., if the user provides a physical address) or by the physical location of the user's computing device (e.g., the location of the user's mobile phone).

The service provider server system 420 can also be configured to determine a wireless carrier of the user based on the user's device (e.g., of the user's mobile phone or other wireless device). For example, the user's internet protocol (IP) address can be determined (e.g., upon the user clicking on a banner advertisement and accessing a landing page hosted by the advertiser server system 410 or service provider server system 420). The IP address of the user's device can be used to determine which wireless carrier the user is using and/or other information regarding the user's device, such as location information. In some implementations, the user's wireless carrier (e.g., predominantly pre-paid carrier vs. predominantly non-pre-paid carrier) can be used to prioritize the user as a lead. For example, if the user is using a predominantly pre-paid wireless carrier, the user can be prioritized lower than other leads that use a predominantly non-pre-paid wireless carrier.

In some implementations, the advertiser server system 410 and/or other system that are not depicted in the environment 400 can perform some or all of the processing described above with regard to the service provider server system 420. For example, the advertiser server system 410 could determine do-not-call status of one of the users 450 by communicating directly with the do-not-call provider 430, then provide a click-to-call link to the user if appropriate.

Exemplary Form for Collecting User Contact Information

In the techniques and solutions described herein, information can be obtained from a user who has indicated interest in an electronic advertisement. For example, a user can provide user contact information after selecting an electronic advertisement, which results in a landing page that provides a web form for collecting the user contact information.

FIG. 5 is a diagram showing an example form 500 for collecting user contact information. For example, a user using a computing device, such as a mobile phone, can select an electronic advertisement (e.g., a banner ad displayed with an application program). In response to selecting the electronic advertisement, a form (e.g., displayed in a web page) can be displayed to the user. The form can be provided by a web server (e.g., a web server operated by, or associated with, an advertiser of the electronic advertisement or a web server operated by, or associated with, another entity, such as a service provider that manages the electronic advertisement for the advertiser). For example, the form 500 could collect user information in response to the user selecting an online college advertisement or an insurance company advertisement.

The example form 500 comprises fields 510 for collecting user contact information. In the example form 500, the fields 510 provide for collection of the user's name, address, zip code, phone number, and email address. In other implementations, different user contact information can be collected by the form 500. For example, the form 500 can collect information related to the specific electronic advertisement selected by the user. As an example, if the user selected an online university advertisement, then the form 500 could collect information related to the user's previous education and the user's desired area of study.

The example form 500 includes a submit button 520. Once the user has completed the form fields 510, the user can select the submit button 520 to complete the form and provide the user contact information to the advertiser and/or service provider for processing.

The user contact information submitted in the form fields 510 can be used to provide a response to the user. For example, a click-to-call link can be provided to the user after the user has submitted 520 the form. The click-to-call link can be provided based on a do-not-call status of the user, as determined by the phone number provided by the user.

Figure 6A:
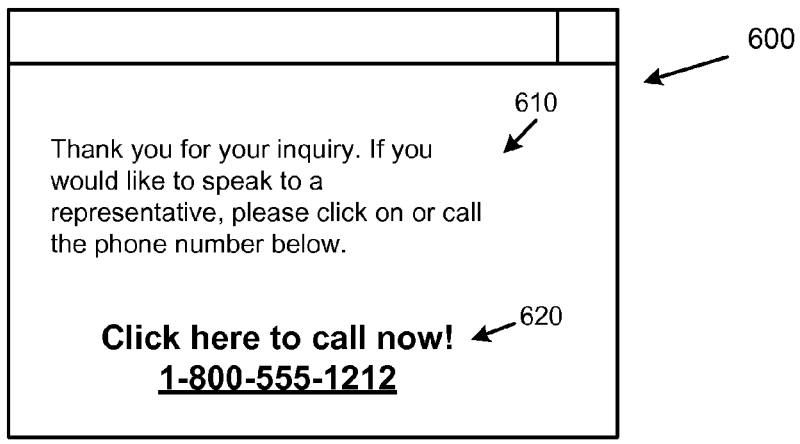
FIG. 6A is a diagram depicting an example response to a user after the user has submitted user contact information, where the user is listed on one or more do-not-call lists.

FIG. 6A is a diagram showing an example response 600 to a user after the user has submitted user contact information (e.g., via a form such as depicted in FIG. 5). The example response 600 is displayed as it could appear on a web page, but the content can be provided to the user in other ways, such as in an email message, text message, etc.

The example response 600 includes text content 610 thanking the user for the inquiry (e.g., for submitting user contact information using a form such as depicted in FIG. 5). The example response 600 also includes a click-to-call link 620, which comprises a phone number associated with the advertiser. When the user selects the click-to-call link 620, a phone call can automatically be initiated (e.g., when the click-to-call link 620 is selected on the user's mobile phone). The user could also manually dial and call the phone number listed in the click-to-call link 620.

FIG. 6A depicts a response that can be provided to the user when the user is represented in one or more do-not-call lists. For example, if the user is represented in one or more do-not-call lists, then the response can contain a click-to-call link (such as 620) and encourage the user to call the click-to-call link (e.g., the "Click here to call now!" content can provide emphasis for the click-to-call link and prompt the user to call).

Figure 6B:
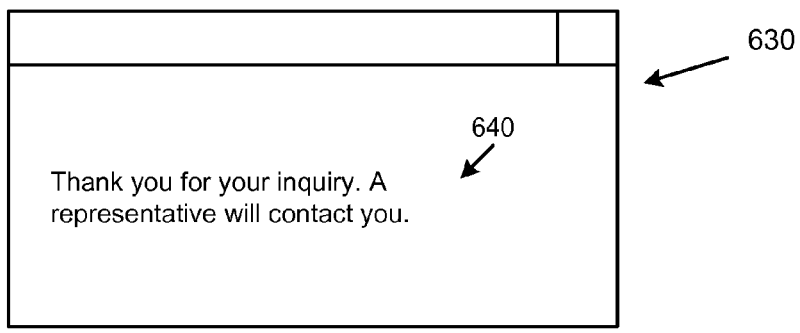
FIG. 6B is a diagram depicting an example response to a user after the user has submitted user contact information, where the user is not listed on one or more do-not-call lists.

FIG. 6B is a diagram showing another example response 630 to a user after the user has submitted user contact information (e.g., via a form such as depicted in FIG. 5). The example response 630 includes text content 640 thanking the user for the inquiry and informing the user that a representative will contact the user. The example response 630 can be provided to the user when the user is not represented in any of the one or more do-not-call lists. For example, if the user is not represented in any of the one or more do-not-call lists, then the click-to-call link can be omitted from the response 630 (e.g., because the advertiser is able to call the user directly).

Figure 6C:
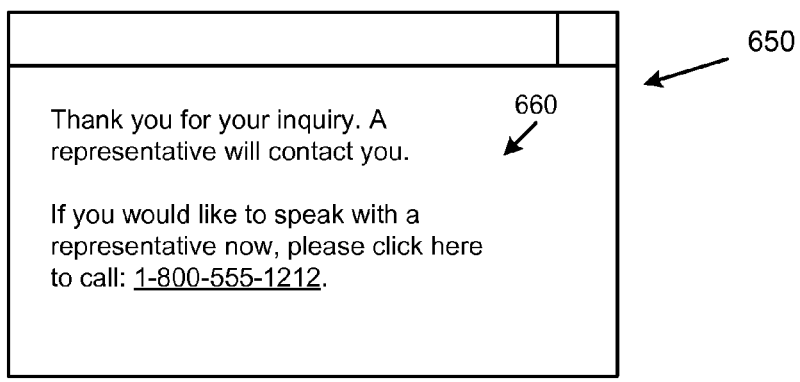
FIG. 6C is a diagram depicting another example response to a user after the user has submitted user contact information, where the user is not listed on one or more do-not-call lists.

FIG. 6C is a diagram showing another example response 650 to a user after the user has submitted user contact information (e.g., via a form such as depicted in FIG. 5). The example response 650 includes text content 660 thanking the user for the inquiry and informing the user that a representative will contact the user. The text content 660 also includes a click-to-call link. The example response 650 can be provided to the user when the user is not represented in any of the one or more do-not-call lists. For example, if the user is not represented in any of the one or more do-not-call lists, then the user can be informed that a representative will contact the user. In addition, a click-to-call link can also be provided to the user as part of the content 660. If the user is not represented in any of the one or more do-not-call lists then the click-to-call link can be presented in a subdued manner (e.g., without the language depicted at 620 in FIG. 6A encouraging the user to call).

Exemplary Computing Devices

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices. The techniques and solutions described herein can be performed in a cloud computing environment (e.g., comprising virtual machines and underlying infrastructure resources).

Figure 7:
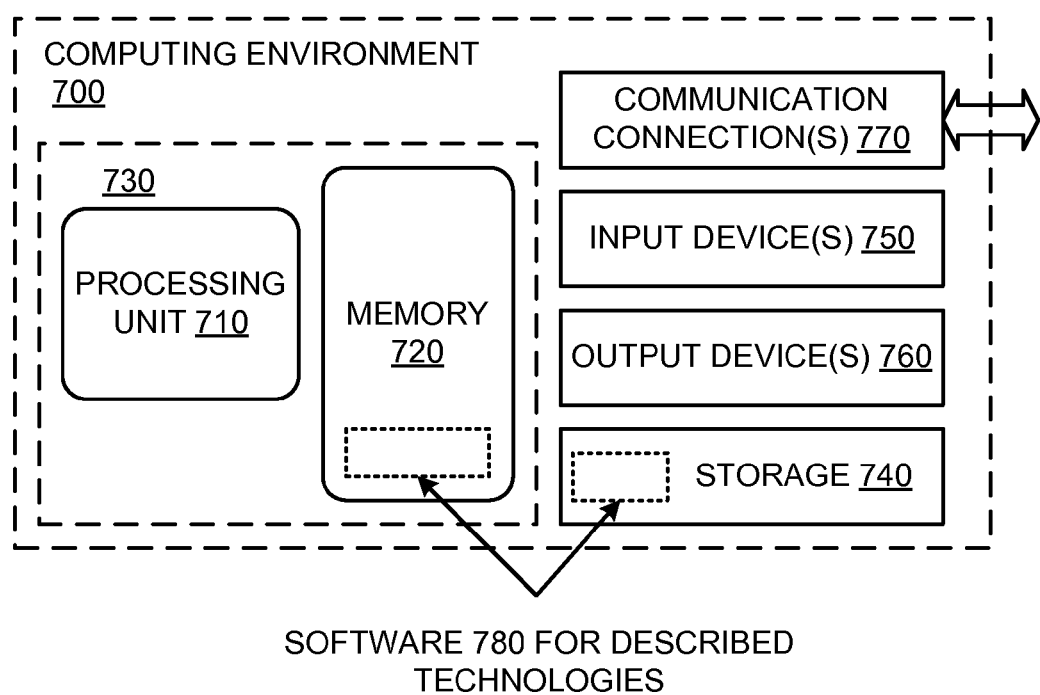
FIG. 7 is a block diagram illustrating an example computing device in conjunction with which techniques and tools described herein may be implemented.

FIG. 7 illustrates a generalized example of a suitable computing environment 700 in which described embodiments, techniques, and technologies may be implemented. The computing environment 700 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, the computing environment 700 includes at least one central processing unit 710 and memory 720. In FIG. 7, this most basic configuration 730 is included within a dashed line. The central processing unit 710 executes computer-executable instructions. In a multi-processing system, multiple processing units execute computer-executable instructions to increase processing power and as such, multiple processors can be running simultaneously. The memory 720 may be volatile memory (e.g., registers, cache, RAM), non-volatile memory (e.g., ROM, EEPROM, flash memory, etc.), or some combination of the two. The memory 720 stores software 780 that can, for example, implement the technologies described herein. A computing environment may have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other tangible storage medium which can be used to store information and which can be accessed within the computing environment 700. The storage 740 stores instructions for the software 780, which can implement technologies described herein.

The input device(s) 750 may be a touch input device, such as a keyboard, keypad, mouse, pen, or trackball, a voice input device, a scanning device, or another device, that provides input to the computing environment 700. For audio, the input device(s) 750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700.

The communication connection(s) 770 enable communication over a communication medium (e.g., a connecting network) to another computing entity. The communication medium conveys information such as computer-executable instructions, compressed graphics information, or other data in a modulated data signal.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as flash memory or hard drives)) and executed on a computer (e.g., any commercially available computer, including smart phones or other mobile devices that include computing hardware). By way of example and with reference to FIG. 7, computer-readable storage media include memory 720 and/or storage 740. As should be readily understood, the term computer-readable storage media does not include communication connections (e.g., 770) such as modulated data signals.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, devices, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims.

I claim:

1. A method, implemented at least in part by a server computer, for managing interaction with an electronic advertisement, the method comprising:
   receiving, by a server computer, user contact information submitted by a user who has indicated interest in an electronic advertisement, wherein the user contact information comprises the user's phone number;
   determining, by the server computer, a do-not-call status of the user based at least in part upon the user's phone number;
   upon determining, by the server computer, the do-not-call status indicates that the user is represented in at least one of one or more do-not-call lists:
      initiating a process of providing, to the user, a click-to-call link for contacting an advertiser associated with the electronic advertisement, wherein the click-to-call link comprises a phone number associated with the advertiser;
   upon determining, by the server computer, that the do-not-call status indicates that the user is not represented in any of the one or more do-not-call lists:
      skipping the process of providing the click-to-call link to the user;
   determining a wireless carrier of the user, wherein the wireless carrier provides service to a mobile computing device of the user, wherein determining the wireless carrier further comprises determining whether the wireless carrier is primarily a pre-paid wireless carrier; and
   prioritizing the user as a lead based at least in part upon the wireless carrier of the user, wherein prioritizing the user as a lead comprises prioritizing the user lower when the wireless carrier is determined to be primarily a pre-pad wireless carrier.

2. The method of claim 1, wherein the one or more do-not-call lists are accessible to the server computer, and wherein the determining the do-not-call status of the user comprises:
   checking, by the server computer, whether the user is represented in the one or more do-not-call lists, wherein whether the user is represented in the one or more do-not-call lists is based on, at least in part, the user's phone number.

3. The method of claim 1, wherein the determining the do-not-call status of the user comprises:
   providing, to a do-not-call checking service by the server computer, the user's phone number; and
   receiving, by the server computer, an indication of whether the user is represented in at least one of the one or more do-not-call lists.

4. The method of claim 1, further comprising:
   receiving an indication of a selection of the electronic advertisement by the user using the mobile computing device; and
   in response to the selection of the electronic advertisement, providing a landing page associated with the electronic advertisement, wherein the landing page comprises a form for collecting the user contact information, and wherein the user contact information is received via the form.

5. The method of claim 1, wherein the click-to-call link is provided to the user as part of a web page transmitted to a computing device of the user.

6. The method of claim 1, wherein the user contact information further comprises the user's email address, wherein the click-to-call link is provided to the user in an email message sent to the user's email address.

7. The method of claim 1, wherein the click-to-call link is provided to the user in a text message sent to the user.

8. The method of claim 1, further comprising, upon determining that the do-not-call status indicates that the user is not represented in any of the one or more do-not-call lists:
   providing, to the advertiser by the server computer, at least some of the user contact information and an indication that a phone call can be initiated to the user's phone number.

9. The method of claim 1, further comprising:
   determining a location of a computing device of the user; and
   selecting a phone number from a plurality of phone numbers associated with the advertiser, wherein the phone number is selected based at least in part upon the location of the computing device of the user, and wherein the click-to-call link comprises the selected phone number.

10. The method of claim 1, further comprising:
    determining a location of a computing device of the user; and
    initiating a process of providing subsequent information to the user based at least in part upon the determined location of the computing device of the user.

11. A server system for managing interaction with an electronic advertisement, the server system comprising:
    a memory;
    a processing unit; and
    a network connection;
    wherein the server system is configured for performing operations comprising:
       determining user contact information for a user who has indicated interest in an electronic advertisement, wherein the user contact information comprises the user's phone number;

determining a do-not-call status of the user based at least in part upon the user's phone number;

upon determining the do-not-call status indicates that the user is represented in at least one of one or more do-not-call lists:

initiating a process of providing, to the user via the network connection, a click-to-call link for contacting an advertiser associated with the electronic advertisement, wherein the click-to-call link comprises a phone number associated with the advertiser, the click-to-call link being formatted to facilitate selection of the click-to-call link by the user to automatically initiate a phone call to the phone number associated with the advertiser;

upon determining that the do-not-call status indicates that the user is not present in any of the one or more do-not-call lists:

skipping the process of providing the click-to-call link to the user;

determining a wireless carrier of the user, wherein the wireless carrier provides service to a mobile computing device of the user, wherein determining the wireless carrier further comprises determining whether the wireless carrier is primarily a pre-paid wireless carrier; and prioritizing the user as a lead based at least in part upon the wireless carrier of the user, wherein prioritizing the user as a lead comprises prioritizing the user lower when the wireless carrier is determined to be primarily a pre-pad wireless carrier.

12. The server system of claim 11, wherein the indication of user interest comprises a selection of the electronic advertisement by the user, and wherein the determining the user contact information comprises receiving the user contact information from the user or from another server system.

13. The server system of claim 11, wherein the indication of user interest comprises a selection of the electronic advertisement by the user, and wherein the determining the user contact information comprises retrieving the user contact information from storage, the user contact information having been previously submitted by the user.

14. The server system of claim 11, wherein the one or more do-not-call lists are accessible to the server system, and wherein the determining the do-not-call status of the user comprises:

checking whether the user is represented in the one or more do-not-call lists.

15. The server system of claim 11, wherein the determining the do-not-call status of the user comprises:

providing, to a do-not-call checking service, the user's phone number; and receiving an indication of whether the user is represented in the one or more do-not-call lists.

16. The server system of claim 11, the operations further comprising:

receiving an indication of a selection of the electronic advertisement by the user using the mobile computing device; and in response to receiving the indication of the selection of the electronic advertisement, providing a landing page associated with the electronic advertisement, wherein the landing page comprises a form for collecting the user contact information, and wherein the user contact information is received via the form.

17. The server system of claim 11, wherein the click-to-call link is provided to the user as part of a web page transmitted to a computing device of the user.

18. The server system of claim 11, wherein the user contact information further comprises the user's email address, wherein the click-to-call link is provided to the user in an email message sent to the user's email address.

19. The server system of claim 11, the operations further comprising, upon determining that the do-not-call status indicates that the user is not present in any of the one or more do-not-call lists:

providing, to the advertiser, at least some of the user contact information and an indication that a phone call can be initiated to the user's phone number.

20. A computer-readable storage media storing computer-executable instructions for execution on a computing device to perform a method for managing interaction with an electronic advertisement, the method comprising:

receiving an indication of a selection of the electronic advertisement by a user using a mobile computing device;

in response to receiving the selection of the electronic advertisement, providing, to the user, a landing page associated with the electronic advertisement, wherein the landing page comprises a form for collecting user contact information;

receiving the user contact information submitted by the user via the form, wherein the user contact information comprises the user's name, phone number, and email address;

determining a do-not-call status of the user based at least in part upon the user's phone number, including processing an indication of whether the user is represented in any of one or more do-not-call lists;

upon determining the do-not-call status indicates that the user is represented in at least one of the one or more do-not-call lists:

providing, to the user, a click-to-call link for contacting an advertiser associated with the electronic advertisement, wherein the click-to-call link comprises a phone number associated with the advertiser, the click-to-call lick being formatted to facilitate selection of the click-to-call link by the user to automatically initiate a phone call to the phone number associated with the advertiser;

upon determining that the do-not-call status indicates that the user is not represented in any of the one or more do-not-call lists:

skipping the providing the click-to-call link to the user;

determining a wireless carrier of the user, wherein the wireless carrier provides service to the mobile computing device of the user, wherein determining the wireless carrier further comprises determining whether the wireless carrier is primarily a pre-paid wireless carrier; and prioritizing the user as a lead based at least in part upon the wireless carrier of the user, wherein prioritizing the user as a lead comprises prioritizing the user lower when the wireless carrier is determined to be primarily a pre-pad wireless carrier.

21. The computer-readable storage media of claim 20, the method further comprising, upon determining that the do-not-call status indicates that the user is not represented in any of the one or more do-not-call lists:

providing, to the advertiser, at least some of the user contact information and an indication that a phone call can be initiated to the user's phone number.

* * * * *